US010325510B2

(12) United States Patent
Jain et al.

(10) Patent No.: US 10,325,510 B2
(45) Date of Patent: Jun. 18, 2019

(54) SYSTEM FOR MEASURING EFFECTIVENESS OF AN INTERACTIVE ONLINE LEARNING SYSTEM

(71) Applicant: Vedantu Innovations Pvt Ltd., Bangalore, Karnataka (IN)

(72) Inventors: Pulkit Jain, Bangalore (IN); Ajith Reddy, Vemulawada (IN); Pranav Ramaraya Mallar, Bangalore (IN); Namo Narain Kaul, Jaipur (IN); Mehar Chandra Palamakula, Hyderabad (IN)

(73) Assignee: VEDANTU INNOVATIONS PVT LTD., Karnataka (IN)

( * ) Notice: Subject to any disclaimer, the term of this patent is extended or adjusted under 35 U.S.C. 154(b) by 218 days.

(21) Appl. No.: 15/379,689

(22) Filed: Dec. 15, 2016

(65) Prior Publication Data

US 2018/0114453 A1    Apr. 26, 2018

(30) Foreign Application Priority Data

Oct. 21, 2016  (IN) .............................. 201641036014

(51) Int. Cl.
| | | |
|---|---|---|
| G09B 5/00 | (2006.01) | |
| G09B 5/06 | (2006.01) | |
| G09B 5/14 | (2006.01) | |
| G09B 5/08 | (2006.01) | |
| G09B 7/02 | (2006.01) | |
| G06F 3/0484 | (2013.01) | |

(52) U.S. Cl.
CPC ............... *G09B 5/065* (2013.01); *G09B 5/08* (2013.01); *G09B 5/14* (2013.01); *G06F 3/0484* (2013.01); *G09B 7/02* (2013.01)

(58) Field of Classification Search
CPC . G09B 5/065; G09B 5/08; G09B 5/14; G06Q 50/20; G06F 3/0484
See application file for complete search history.

(56) References Cited

U.S. PATENT DOCUMENTS 10,126,927 B1 * 11/2018 Fieldman ............ G06F 3/04847
2010/0009332 A1 * 1/2010 Yaskin ..................... G09B 7/00
434/362

(Continued)

*Primary Examiner* — Peter R Egloff
(74) *Attorney, Agent, or Firm* — Harness, Dickey & Pierce, P.L.C.

(57) ABSTRACT

An interactive system for facilitating interaction between one or more users is provided. The system includes computing devices accessible to several users, including a user interface to enable the user to activate an interaction session amongst a selected set of users; and a plurality of interactive tools to enable each user to communicate with the selected set of users via the user interface. The interactive system includes a session data module to acquire session data from each computing device. The session data module is to acquire session data from each computing device. The interactive system also includes a processing engine to compute an effectiveness score and an engagement score of the interaction session by analyzing the session data. The effectiveness score and the engagement score is continuously computed for a duration and a quality score is calculated as a function of the engagement score and the effectiveness score.

15 Claims, 10 Drawing Sheets

(56) References Cited

U.S. PATENT DOCUMENTS

| | | | |
|---|---|---|---|
| 2012/0231441 A1* | 9/2012 | Parthasarathy | G09B 7/02 434/362 |
| 2014/0162239 A1* | 6/2014 | Roach | G09B 5/125 434/350 |
| 2014/0205984 A1* | 7/2014 | Chapman | G09B 5/00 434/308 |
| 2015/0379879 A1* | 12/2015 | Selkirk | G06Q 10/00 434/309 |
| 2016/0049082 A1* | 2/2016 | Leatherman, III | G09B 5/06 434/408 |
| 2016/0225275 A1* | 8/2016 | Wood | G06Q 10/101 |

* cited by examiner

| METRICS | \multicolumn{4}{c}{LOWS} | | | |
| --- | --- | --- | --- | --- |
| | A | B | C | D |
| Shapes and Images | <4.0 | <2.5 | <4.0 | <2.0 |
| Color Changes | <6 | <6 | <6 | <6 |
| Teacher Write Length | <15k | <15k | <12k | <12k |
| Whiteboard Space Usage | <45% | <45% | <45% | <45% |
| Teacher Writing Time | <180 | <250 | <180 | <150 |
| Whiteboard Inactive Time | >89% | >85% | >85% | >88% |
| No. of Whiteboards | <8.0 | <7.0 | <8.0 | <5.0 |
| Interaction | <85 | <68 | <68 | <70 |
| st ratio | <0.04 | <0.04 | <0.04 | <0.04 |
| Same Time | <60 | <58 | <26 | <61 |
| Student Wait Time | >240 | >240 | >240 | >240 |
| Student Interest | <3.0 | <3.0 | <3.0 | <3.0 |
| HW Variance | <10.0 | <10.0 | <10.0 | <10.0 |
| Image Annotation | <83 | <84 | <142 | <94 |

SYSTEM FOR MEASURING EFFECTIVENESS OF AN INTERACTIVE ONLINE LEARNING SYSTEM

PRIORITY STATEMENT

The present application hereby claims priority under 35 U.S.C. § 119 to Indian patent application number IN 201641036014 filed Oct. 21, 2016, the entire contents of which are hereby incorporated herein by reference.

FIELD

The invention relates generally to online learning systems and more particularly to a system and method for measuring a quality of an interaction session conducted via an online learning system.

BACKGROUND

Online learning systems represent a wide range of methods for electronic delivery of information in an education or training set-up. More specifically, interactive online learning systems are revolutionizing the way education is imparted. Such interactive online learning systems offer an alternate platform that is not only faster and potentially better but also bridges the accessibility and affordability barriers for the users. Moreover, the online learning systems provide users with the flexibility of being in any geographic location while participating in the session.

Apart from providing convenience and flexibility, such online learning systems also ensure more effective and engaging interactions in a comfortable learning environment. With advancement of technology, personalized interactive sessions are provided according to specific needs rather than just following a set pattern of delivering knowledge as prescribed by conventional educational institutions. Each session is tailor-made to meet the needs of the specific user. Moreover, such system allows a mobile learning environment where learning is not time bound (anywhere-anytime learning).

However, there is a need to monitor such interactions and to measure the efficiency of such online learning systems. There is also a need to classify users for a more accurate matching process, which in turn will improve the quality of education. Currently the effectiveness of such interactive learning systems is manually reviewed. Such manual interventions could be time consuming and less scalable. Moreover, reviews done in such manner lead to subjective and inaccurate ratings.

Therefore, an accurate and highly scalable system is required, for measuring the effectiveness and engagement of an interaction session conducted on an online learning system.

SUMMARY

The following summary is illustrative only and is not intended to be in any way limiting. In addition to the illustrative aspects, example embodiments, and features described, further aspects, example embodiments, and features will become apparent by reference to the drawings and the following detailed description. Example embodiments provide an interaction system to measure effectiveness and engagement of an interactive session in an online learning system.

Briefly, according to an example embodiment, an interactive system for facilitating interaction between one or more users is provided. The system includes a plurality of computing devices. Each computing device is accessible to a corresponding user. Each computing device includes a user interface for each user. The user interface is configured to enable the user to activate an interaction session amongst a selected set of users. Each computing device also includes a plurality of interactive tools coupled to the user interface and configured to enable each user to communicate with the selected set of users via the user interface. Further, the interactive system includes a session data module coupled to the plurality of computing devices and configured to acquire session data from each computing device. The session data module is configured to acquire session data from each computing device. Furthermore, the interactive system also includes a processing engine coupled to the session data module and configured to compute a quality score which correlates to an effectiveness score and an engagement score. The effectiveness score and the engagement score is determined by analyzing the session data and is continuously computed for a duration of the interaction session.

According to yet another example embodiment, a system for providing an interactive educational tool is provided. The system includes one or more computing devices coupled together over a network. Each computing device comprises at least one processor and one memory unit. The computing devices are configured to transmit a set of computer-executable instructions to one or more user devices. The set of computer executable instructions when executed result in a student device simulating a first component of an educational interaction session. Another set of computer executable instructions when executed result in a teacher device simulating a second component of the educational interaction session. Further, at least one memory unit is configured to extract and store audio, video and text data from the first component and the second component of the educational interaction session. In addition, at least one processor is configured to calculate a quality score which correlates to an effectiveness score and an engagement score. The effectiveness score and the engagement score is determined by analyzing the session data.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein:

FIG. 10, is an example of metrics table illustrating a plurality of parameters calculated using session data, implemented according to aspects of the present technique;

FIG. 11 is an example report illustrating quality scores of several interaction sessions, implemented according to aspects of the present technique

DETAILED DESCRIPTION OF EXAMPLE EMBODIMENTS

Figure 1:
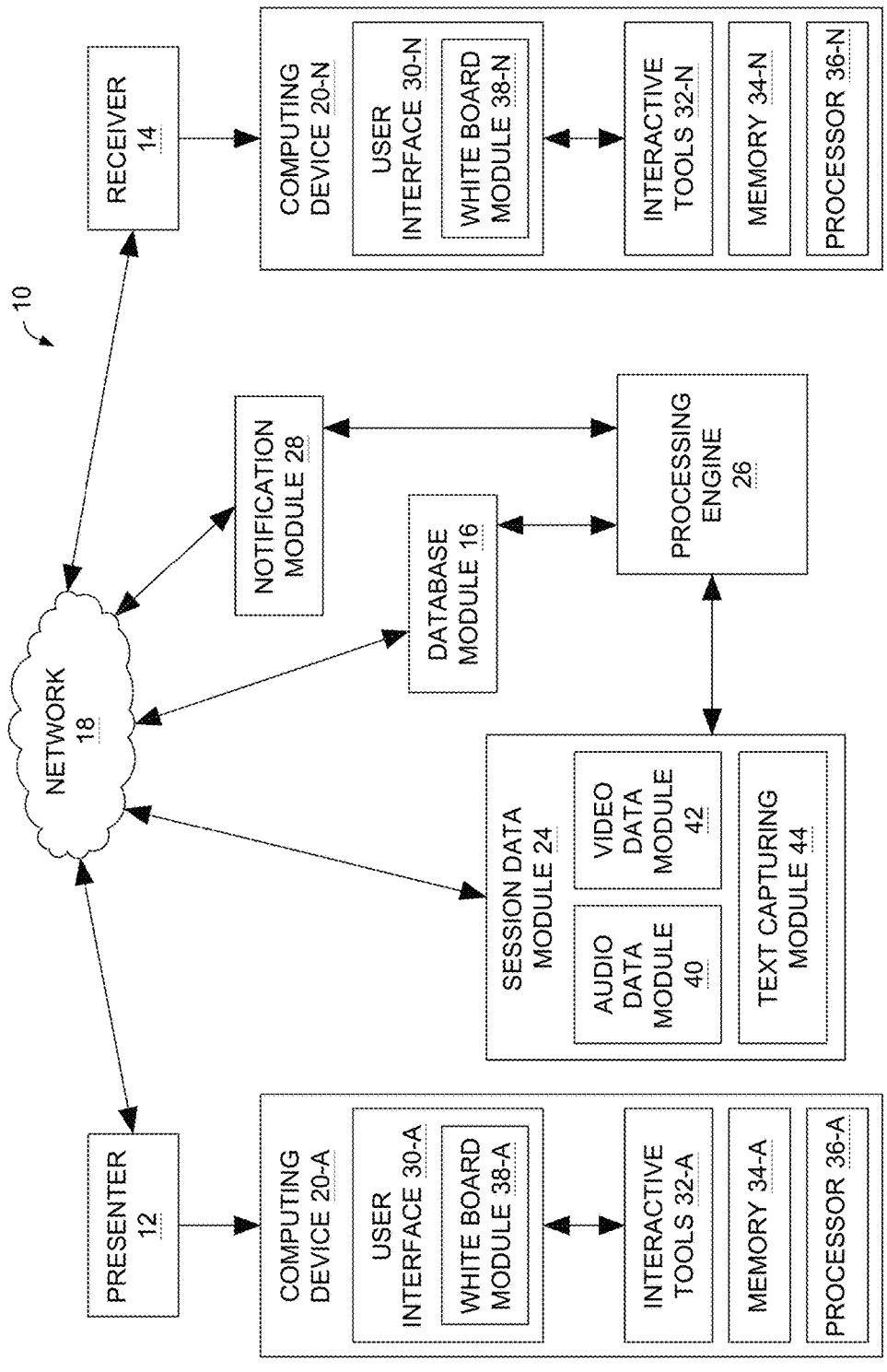
FIG. 1 is a block diagram of an interactive system to measure effectiveness and engagement of an interaction session, according to the aspects of the present invention.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein.

Accordingly, while example embodiments are capable of various modifications and alternative forms, example embodiments are shown by way of example in the drawings and will herein be described in detail. It should be understood, however, that there is no intent to limit example embodiments to the particular forms disclosed. On the contrary, example embodiments are to cover all modifications, equivalents, and alternatives thereof. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. Inventive concepts may, however, be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the scope of inventive concepts.

Spatial and functional relationships between elements (for example, between modules) are described using various terms, including "connected," "engaged," "interfaced," and "coupled". Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The systems described herein, may be realized by hardware elements, software elements and/or combinations thereof. For example, the devices and components illustrated in the example embodiments of inventive concepts may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

At least one example embodiment is generally directed to an interactive system and techniques for measuring an efficiency and effectiveness of an interaction session conducted via the interactive system. Example embodiments of the present technique provide an interactive system and method which analyzes various types of data to determine an effectiveness score and an engagement score for an interaction session. These scores are correlated to a quality of the interaction session by determining its quality score.

FIG. 1 is a block diagram of one embodiment of an interactive system to measure effectiveness and engagement of an interaction session, according to the aspects of the present invention. As used herein, an interaction session is a session initiated by one or more users via the interactive system. The interactive system 10 (which may hereinafter be simply referred to as the system 10) includes computing device 20-A through 20-N, a session data module 24, a processing engine 26, a database 16 and a notification module 28. All components are connected via a network 18. Each component is described in further details below.

Computing devices 20-A and 20-N are configured to facilitate a plurality of users to engage in an interaction session, according to aspects of the present technique. Examples of computing devices include personal computers, tablets, smartphones, and the like. In one embodiment, each computing device is accessible to a corresponding user. In this specific embodiment, the computing device 20-A is being accessed by presenter 12. Similarly, the computing device 20-N is being accessed by receiver 14. Although, FIG. 1 is illustrated with only two users, it may be understood by one skilled in the art that system can support multiple users per session. As used herein, presenter refers to an entity that is imparting information to a receiver during an interaction session. For conciseness, in the following paragraphs of the specification, the presenter is a teacher and the receiver is a student and the interaction session is aimed at providing educational content. The computing device 20-A and 20-N comprises among other components, user interface 30-A and 30-N, interactive tools 32-A and 32-N, memory unit 34-A and 34-N and processor 36-A and 36-N.

Session data module 24 is coupled to the computing devices that are engaged in the interaction session and configured to acquire session data from each computing device. As used herein, session data may include audio data, video data, image data, text data and the like. In one embodiment, the session data module 24 comprises an audio data module 40, a video data module 42 and a text capturing module 44. The audio data module 40 is configured to extract audio data from computing devices 20-A and 20-N. The audio data may include but not limited to the different questions asked, rhetorical questions along with the flow of conversation between the student and/or the teacher. The audio data may include the ratio of speaking time of student and/or teacher. The audio data may further include measurement of the pace of the session to better match the student and the teacher.

Video data module 42 is configured to capture video data from computing devices 20 and 20-N. Examples of video data include the video of the teacher and the student captured during the interaction session. In one embodiment, it is used to identify facial expressions which would assist in the determination of attentiveness and engagement of the student.

Text capturing module 44 is configured to capture the written content from the whiteboard module 38 used by one or more users engaged in the interaction session. The written content data may include whiteboard usage patterns such as number of pages used, use of images and different colors, ratio of used space to empty space, time spent on the whiteboard usage. The written content data may further include an image or shape that may actually be referred to during the interaction session. In one embodiment, the written content provided by the student is visible to all participants in the interaction session.

Processing engine 26 is coupled to the session data module 24 and is configured to analyze the session data to determine an effectiveness score and engagement score of the interaction session. Processing engine is further configured to compute a quality score. In one embodiment, the quality score is mathematically correlated to the engagement score and the effectiveness score.

In one embodiment, the engagement score indicates an engagement of a student and an effectiveness score indicates an effectiveness of the teacher. In one embodiment, the effectiveness score and the engagement score is continuously computed during a course of the interaction session. In a further embodiment, the engagement score and the effectiveness score is provided to the student and the teacher respectively, at regular intervals during the interaction session. In addition, the engagement score and the effectiveness score is provided at the end of the interaction session as well.

The engagement score and the effectiveness score is computed by analyzing the session data acquired during the interaction session. In one embodiment, the processing engine 26 is configured to analyze the written content by calculating a plurality of qualitative parameters associated with each user and by determining different handwriting parameters from the written content. Similarly, the processing engine 26 is configured to analyze the audio data by calculating a plurality of audio parameters associated with each user. In addition, as mentioned above, a quality score is computed based on the engagement score and the effectiveness score. Moreover, the processing engine 26 is configured to compute a sentiment score by analyzing the video data, audio data and the written content.

Processing engine is further configured to generate a consolidated report indicating quality scores of all interaction sessions for a given interval of time. For example, a consolidated report is generated once every day. The consolidated report provides insight into the engagement and the effectiveness of each session which could be in turn used to improve subsequent interaction sessions with the same set of users or others.

Database 16 is configured to store audio data, video data and text data (written content) extracted by the session data module. In addition, other general parameters are also stored in database 16. The database may also store analysis data, and feedback from several users engaged in multiple interaction sessions across a large period of time. Various parameters used in predefined model are also retrieved from database 16.

Notification module 28 is configured to notify the effectiveness score and the engagement score to corresponding users at regular intervals within the duration of the interaction session. The engagement score can be sent to the student or the guardian and the effectiveness score can be reported to the teacher or a supervisor.

Notification module 28 is further configured to generate feedback forms and surveys at the end of each session to all the users engaged in the interaction session. The feedback collected from the users may also be analyzed to understand gaps that may have occurred in the interaction session. As described above, the engagement score and the effectiveness score is computed based on the session data. The manner in which the session data is acquired from each computing device is described below in further detail.

Figure 2:
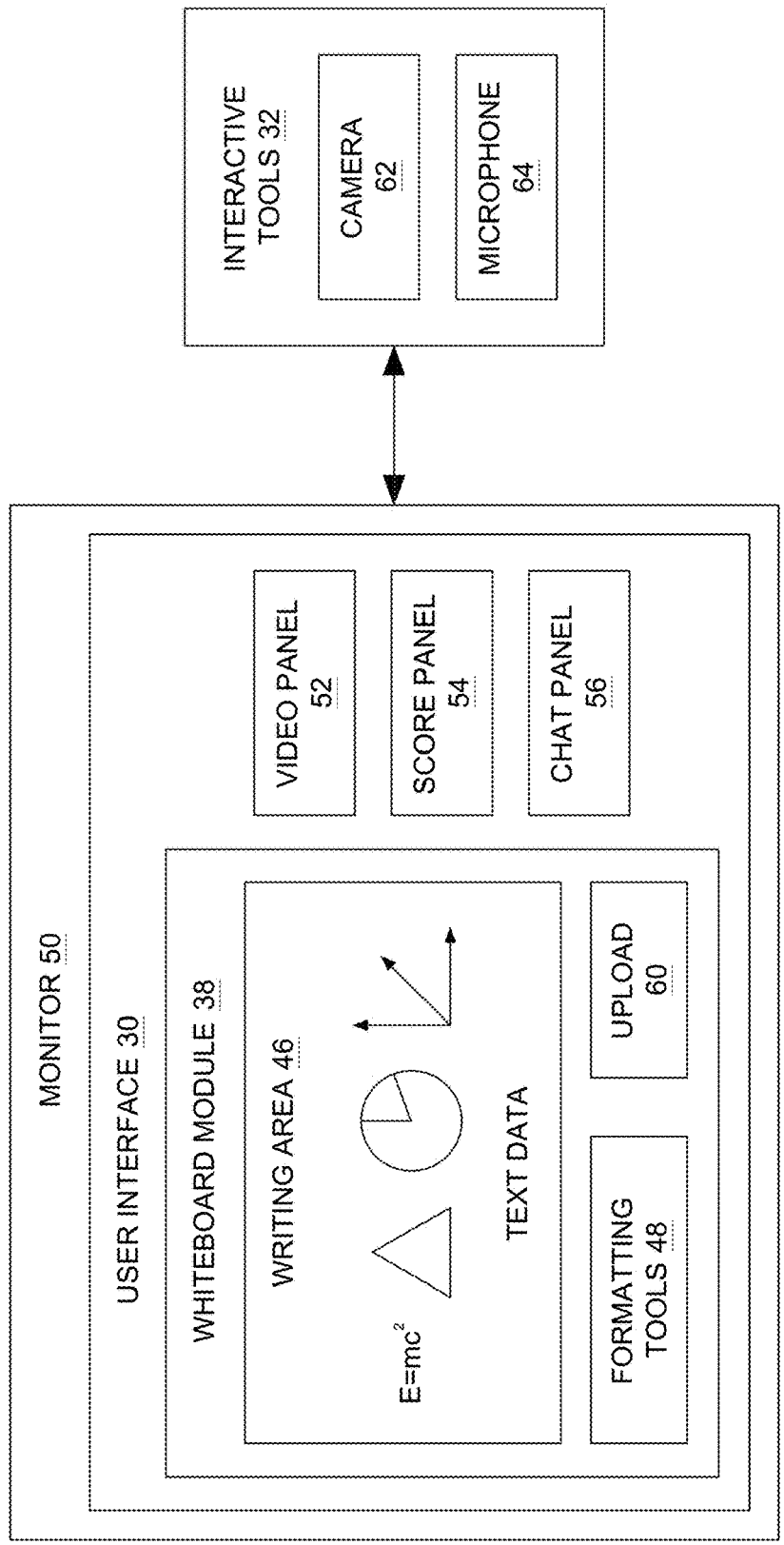
FIG. 2 is a block diagram of an embodiment of a user interface implemented according to aspects of the present technique.

FIG. 2 is a block diagram of an embodiment of a user interface during an interaction session, implemented according to aspects of the present technique. User interface 30 is displayed on a monitor 50 and is configured to enable a first user to activate an interaction session amongst a selected set of users. In one embodiment, the user interface 30 comprises whiteboard module 38, a video panel 52, a score panel 54 and a chat panel 56. Interactive tools 32 are used to capture video and audio inputs from the user. In this embodiment, the user is a teacher or a student. Each component is described in further detail below.

Whiteboard module 38 is configured to enable each user in the interaction session to communicate amongst each other by providing written content in writing area 46. Examples of written content include alpha-numeric text data, graphs, figures and scientific notations. The whiteboard module further includes formatting tools 48 that would enable each user to 'write' on the writing area 46. Examples of formatting tools 48 may include a digital pen for writing, a text tool to type in the text, a color tool for changing colors, a shape tool used for generating figures and graphs. In addition, an upload button 60 is configured for providing theoretical, diagrammatic and other animated references. The user can upload images of pre-written questions, graphs, conceptual diagrams and other useful/relevant animation representations.

Whiteboard module 38 is configured to display written content provided by all users engaged in the interaction session. In one embodiment, when a user runs out of space in the writing area, the whiteboard module provides an option to start a new page. The previous pages are stored and are made available to the users engaged in the interaction session at any given time.

Video panel 52 is configured to display video signals of the selected set of users. In one embodiment, the video data of a user that is speaking at a given instance is displayed on the video panel 52.

Score panel 54 is configured to receive and display an engagement score or an effectiveness score, based on the user. For example, if the user is a student, an engagement score is displayed to the student in the score panel 54. If the user is a teacher, an effectiveness score is displayed on the score panel 54. Additionally, the engagement score may also be displayed to the teacher to indicate the level of engagement of the student(s) engaged in the interaction session.

Chat panel 56 is configured to enable all users engaged in the interaction session to message each other during a course of the session. In one embodiment, the messages in the chat panel 56 are visible to all users engaged in the interaction session.

Interactive tools 32 are configured to enable each user to communicate with the selected set of users using speech and/or video signals. The interactive tools may include a camera 62 for obtaining and transmitting video signals and a microphone 64 for obtaining audio input. In addition, the interactive tools may also include mouse, touch pad, keyboard and the like. As described earlier, the session data module is configured to extract session data from the interactive tools 32 and the whiteboard module 38 for further analysis. The manner in which analysis is performed is described below in further detail.

Figure 3:
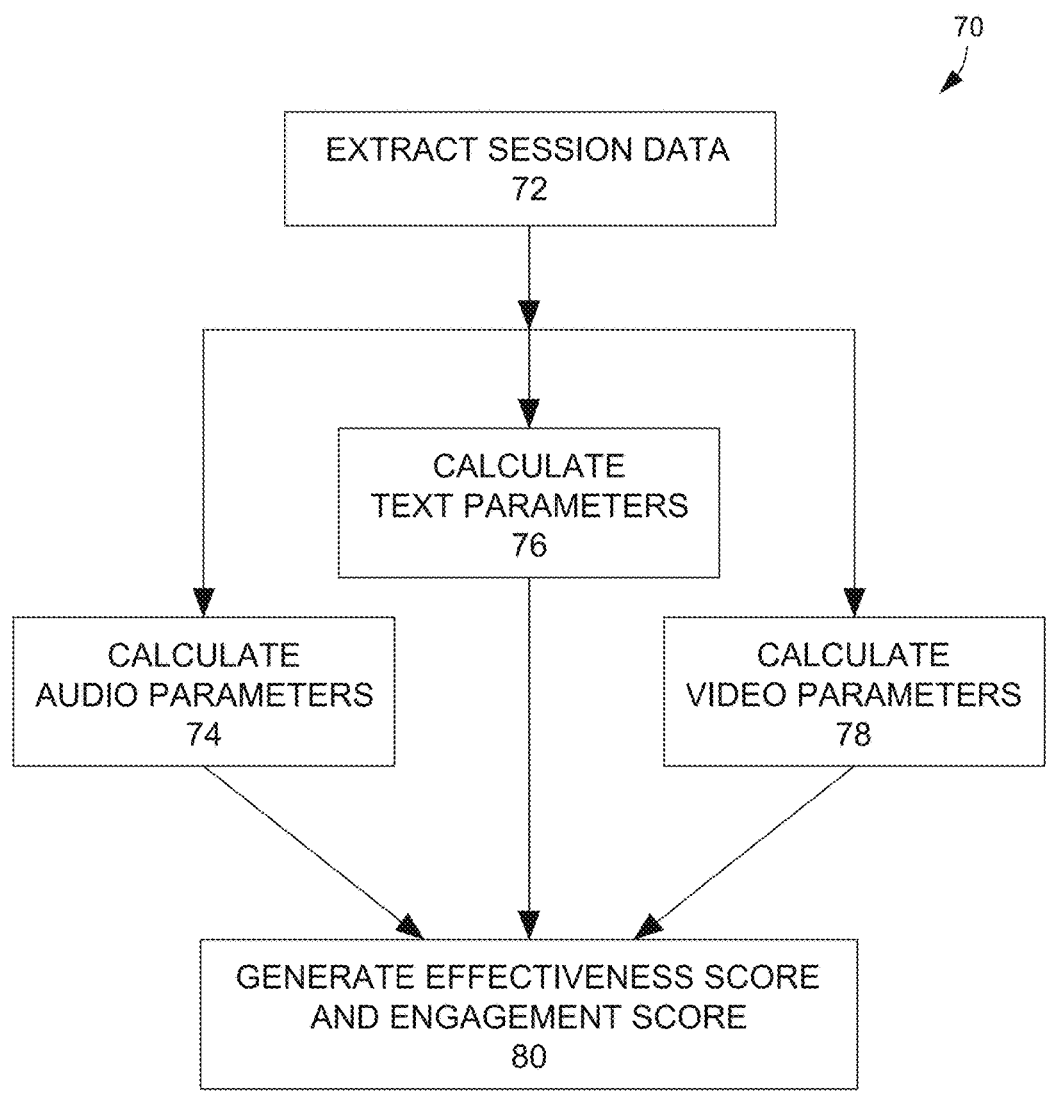
FIG. 3 is a flow diagram of one embodiment of an interactive system to measure different parameters of effectiveness and engagement of an interaction session, according to the aspects of the present technique.

FIG. 3 is a flow diagram of a method for calculating an effectiveness score and engagement score for an interaction session, according to the aspects of the present technique. As described above, the engagement and effectiveness scores are calculated using session data acquired during the interaction session. The manner in which the scores are calculated is described in further detail below.

At step 72, the session data is extracted from the session data module. In one embodiment, the session data includes audio data, video data or text data (written content). The session data can be retrieved either when the interaction session is active or offline, at a later time.

At step 74, audio parameters from the audio data are calculated. In one embodiment, the audio data includes conversations between the users in the interaction session. The audio parameters extracted includes the 'talk time' of each user engaged in the interaction session. Further, the number of pauses in the interaction session can also be extracted. Several other audio parameters are also calculated which will be described in further detail in FIG. 4.

At step 76, text parameters from the text data are calculated. The text parameters may include whiteboard usage patterns such as pages used, colors used, image or shape frequency, time spent on the whiteboard usage. Several other text parameters are also calculated which will be described in further detail in FIG. 6.

At step 78, video parameters from the video data are calculated. Video data includes the video captured during the session. Video parameters extracted may include facial expressions to identify attentiveness of student along with interest level of the student. Video parameters may also include tracking eye movement to make sure the students are not distracted during the sessions. In addition, general parameters are also calculated. The general parameters may include but not limited to measurement of receiver's cursor movement during session to indicate engagement, shifting of tab by the student, etc.

At step 80, an engagement score and an effectiveness score of the interaction session is generated based on the various calculated audio, text and video parameters. The engagement score and the effectiveness score are further used to calculate a quality score for the interaction session. In one embodiment, the quality score is a function of the engagement score and the effectiveness score.

The engagement score of a student, for example, is calculated based on several activities of the student such as answering questions, solving problems, interest based on audio and video, the time taken by the student to respond to questions, etc. Similarly, the effectiveness score is based on all activities occurring during the course of the interaction session such as the number of questions and type of questions posed by the student. The effective use of time by using images etc. and ability of teacher to keep the student interested is also used to measure the effectiveness of teachers.

The scores are derived based on weightages of audio, video and text parameters. Further, based on the patterns observed in the interactions sessions, each session may be classified to be good or satisfactory, based on student feedback, teacher feedback, tests and manual reviews. In an embodiment, based on the effectiveness score of the teacher and engagement score of the student, the processing engine is configured to update and improve the predefined model. As described in step 74, various audio parameters are calculated from the audio data. The various parameters are described in further detail below.

Figure 4:
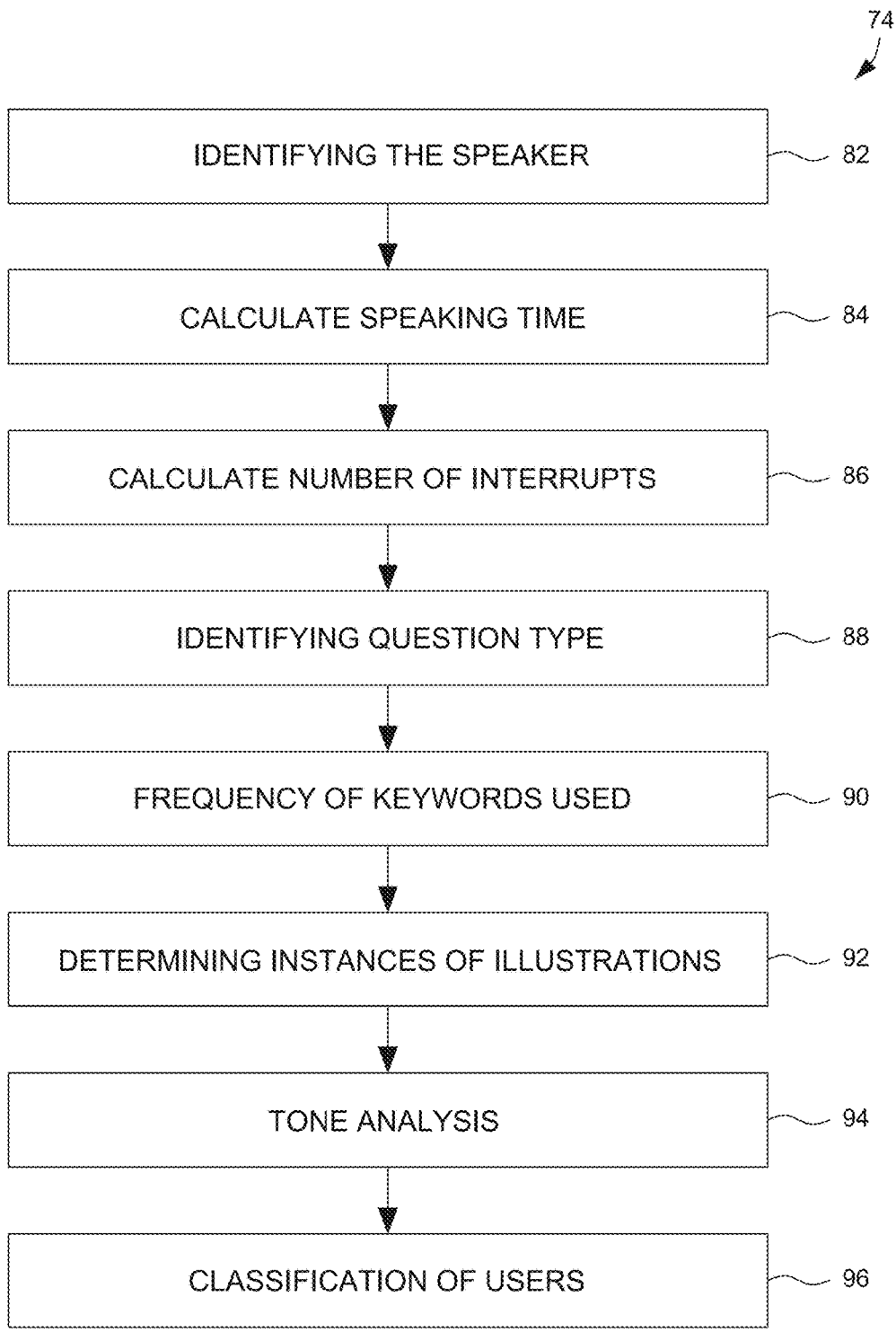
FIG. 4 is a flow diagram illustrating steps involved in analyzing the audio data for measuring effectiveness and engagement of an interaction session, according to the aspects of the present invention.

FIG. 4 is a flow diagram illustrating one method for analyzing audio data extracted during an interaction session, implemented according to aspects of the present technique. The audio data extracted by the audio module is the raw audio data corresponding to the actual conversation between the users engaged in the interaction session. The manner in which the audio data is analyzed is described in detail below.

At step 82, one or more speakers are identified from the audio data. For example, an interaction session may involve a teacher and one or more students. Each voice in the audio data is identified and tagged to a specific user. For clarity, the steps herein are described with reference to an interaction session including a teacher and a student.

At step 84, the speaking time of the student and the teacher is measured. In general, the speaking time refers to the total time each user speaks during a course of the interaction session. In addition, the number of pauses and the period of no activity for each user engaged in the interaction session are also calculated. Further, a ratio of the student's speaking time to teacher's speaking time is calculated for the interaction session.

At step 86, the number of interrupts made by the user is calculated. In an interaction session between a teacher and a student, the number of interrupts made by student and the teacher is calculated. Further, a conversation flow between the teacher and student is determined. The conversation flow is calculated based on the number of times a student and a teacher converse on a specific topic. In general, a flow is established based on back and forth questions, answers, references, etc.

At step 88, different types of questions are identified from the audio data. In one embodiment, three specific types of questions are identified. These questions include rhetorical questions, proper questions and problem solving questions. In one embodiment, the questions are determined by the flow of conversation between the student and the teacher. Rhetorical questions are determined by short responses. Proper questions are determined by long responses given by the teacher/student. In one embodiment, the number of problem solving questions in an interaction session is a measure of the quality of the content used in an interaction session.

At step 90, a frequency of certain keywords used in the interaction session is determined. In addition, instances of the identified keywords used by the teacher are also determined. Further, a speaking rate of the teacher is determined and a pattern emerging from the speaking rate and the identified keywords are further observed.

At step 92, the number of instances each user described a topic along with illustrations are determined. In one embodiment, the instances of illustration are further analyzed by analyzing the written content on whiteboard as well as the audio parameters.

At step 94, tone analysis of the student and teacher is determined. In one embodiment, the tone analysis determines the effectiveness of the teacher and in turn the effectiveness of the interaction session. In one embodiment, the teacher's tone is compared to a predefined model to determine a level of effectiveness.

At step 96, the teacher and student are classified. The teachers are classified based on various criteria such as slow or fast paced teachers, methods used (conceptual, illustrative or visual) for explanations, teacher's ability to engage the student in problem solving. Similarly, the students are classified into various categories such as slow learners, fast learners, students with fast problem solving skills and the like. The classification of users facilitates a more accurate matching process. Further, trends in the effectiveness scores and engagement scores are obtained and analyzed. In addition, a dynamicity of the teacher is calculated to enhance the engagement of student.

Figure 5:
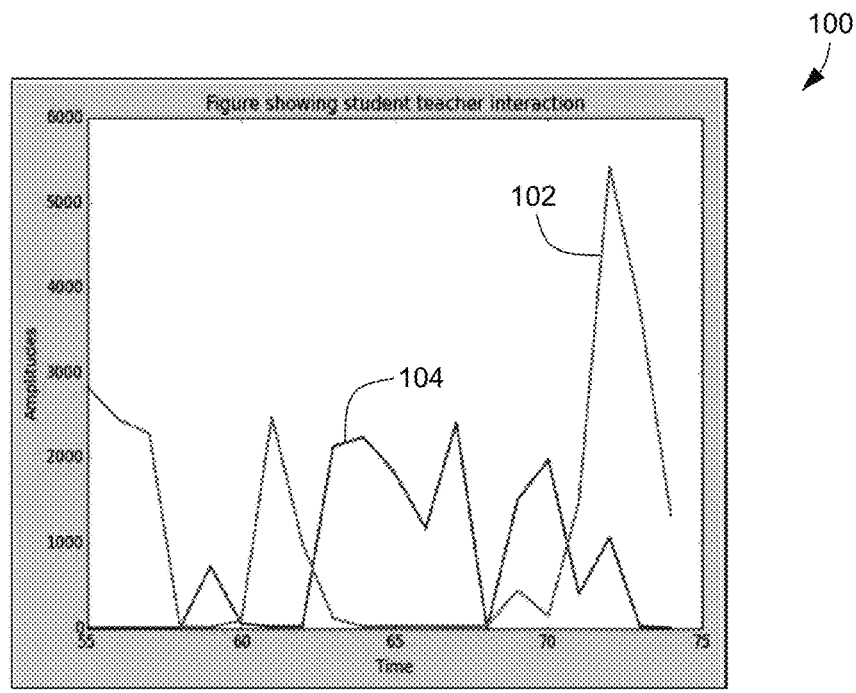
FIG. 5 is an example illustration of an audio interaction occurring in an interaction session, according to the aspects of the present invention.

As described above, the audio parameters give a good insight of the audio interaction between a teacher and a student. An example illustration is shown in FIG. 5. Graph 100 shows the audio interaction of the student represented by 102 and the audio interaction of the teacher represented by 104. The graph shows that there is sufficient interaction between the student and the teacher. In addition to calculating audio parameters for determining the effectiveness and engagement scores, text parameters are also determined as described in further detail below.

Figure 6:
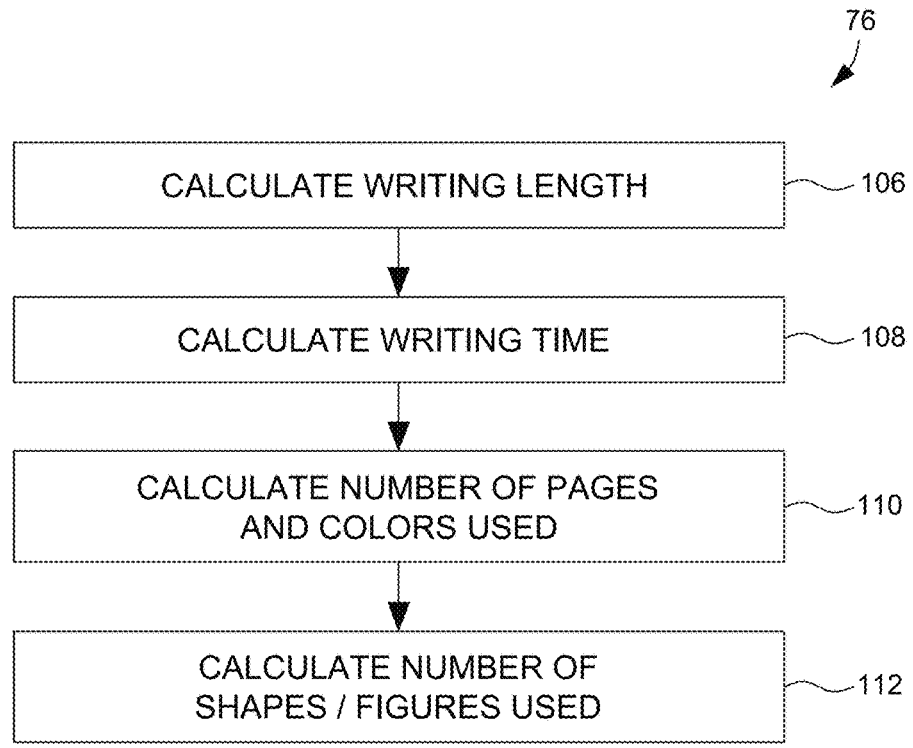
FIG. 6 is a flow diagram illustrating one method for analyzing the text data, according to the aspects of the present techniques.

FIG. 6 is a flow diagram illustrating one method for analyzing the text data, according to the aspects of the present techniques. The text data is extracted from the session data and is used in the computation of an engagement score and an effectiveness score. Text data refers to written content provided by users engaged in the interaction sessions. For the purpose of illustration, it is assumed that the users engaged in the interaction session is a student and a teacher. Each step in the process is described in further detail below.

At step 106, text parameters such as teacher's writing length and student's writing length are calculated. Further, a ratio of the student's writing length to the teacher's writing length is calculated. In one embodiment, writing length is be determined by calculating an effective space used in each page in the writing area of whiteboard. One technique by which the effective space is calculated is by identifying a start point and an end point on each page of the whiteboard and taking the area wise ratio of written space and blank spaces. The effective space utilized in the whiteboard is calculated as an average of the effective space utilized on each page.

At step 108, the teacher's writing time and the student's writing time are calculated. As used herein, writing time is generally referred to the time spent by the teacher and/or the student to write content in the writing area of the whiteboard. The total active time for each the teacher and the student is obtained and the ratio calculated is used to determine the engagement score and the effectiveness score.

At step 110, the number of pages used in the whiteboard module of the student and the teacher engaged in the interaction session is calculated. Such parameters are used to determine the amount of written content that has been discussed between the teacher and the student in each interaction session. In addition, the number of times the student and/or the teacher changes the color while using the whiteboard, is also determined. The usage of different colors while writing can be used to determine the visibility and clarity of the written content.

At step 112, a number of shapes and figures used by each the teacher and the student and frequency of image uploads is calculated. Moreover, the relevancy with the respective content of each figure or image is also checked. Further, image annotations and shape annotations are determined. This involves the amount of written content with respect to a shape, figure or image and the vicinity between the written content and associated shape or image. Further, handwriting of the student and/or the teacher is also analyzed. The manner in which the handwriting is analyzed is described in further detail below.

Figure 7:
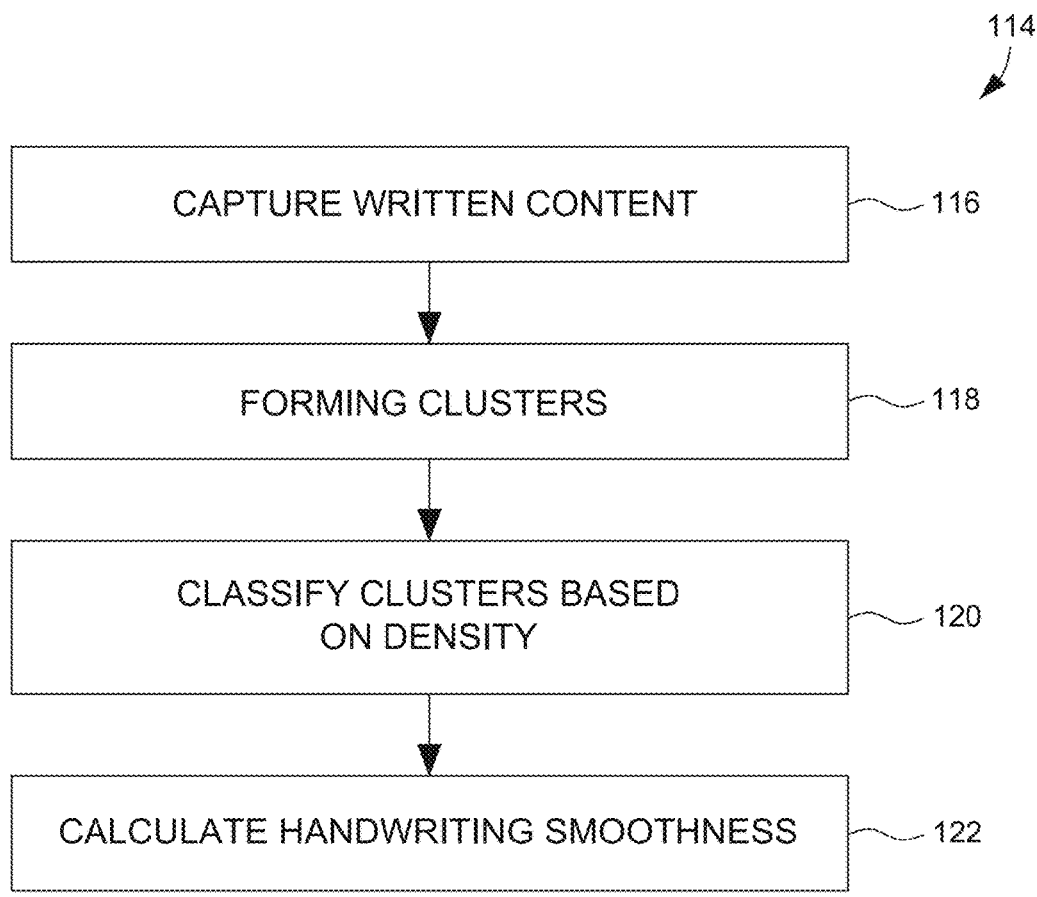
FIG. 7, is the flow diagram, illustrating the steps used in handwriting analysis of the written content used in an interaction session, according to aspects of the present technique.

FIG. 7, is the flow diagram illustrating one method for handwriting analysis, according to aspects of the present technique. The handwriting analysis is performed to determine an effectiveness score of the interaction sessions. Each step of the method is described in further details below.

At step 116, the written content on the whiteboard is captured. In one embodiment, all points present on the writing area of the whiteboard is captured and stored. The written content may include text, figures, graphs and images, etc.

At step 118, multiple clusters of all points on the writing area of whiteboard are formed. In one embodiment, a density of clusters of all the points is analyzed. In one embodiment, K-means algorithm is used for calculating the density of the clusters. The density of the clusters is used to determine a clarity of the handwriting of the teacher and/or the student.

At step 120, classification of the clusters is obtained based upon their density. In one embodiment, the density of each cluster is determined based on the radius of the cluster. Such density points are identified to be in different ranges for different type of written content and are therefore used to identify portions with written text. The density of the clusters is used to identify portions of points that relate to text data and to remove portions that are related to non-text data such as images, drawings, and the like.

At step 122, the smoothness of the handwriting is calculated. In one embodiment, the smoothness of the handwriting is measured by measuring a change in the variance of consecutive angles formed by joining consecutive points. This is done to determine clarity for written text.

Figure 8:
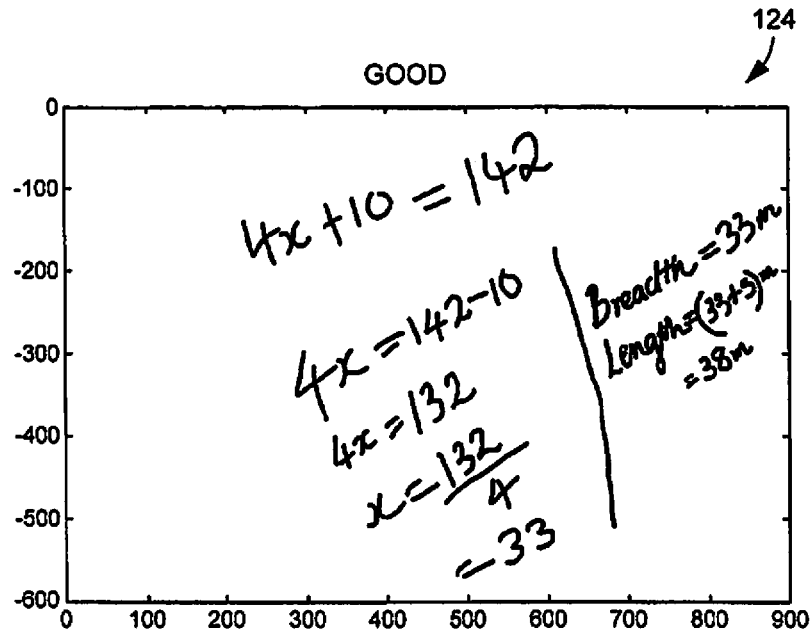
FIG. 8, is a screenshot example of written text determined as "good" by the handwriting analysis, according to aspects of present technique.
Figure 9:
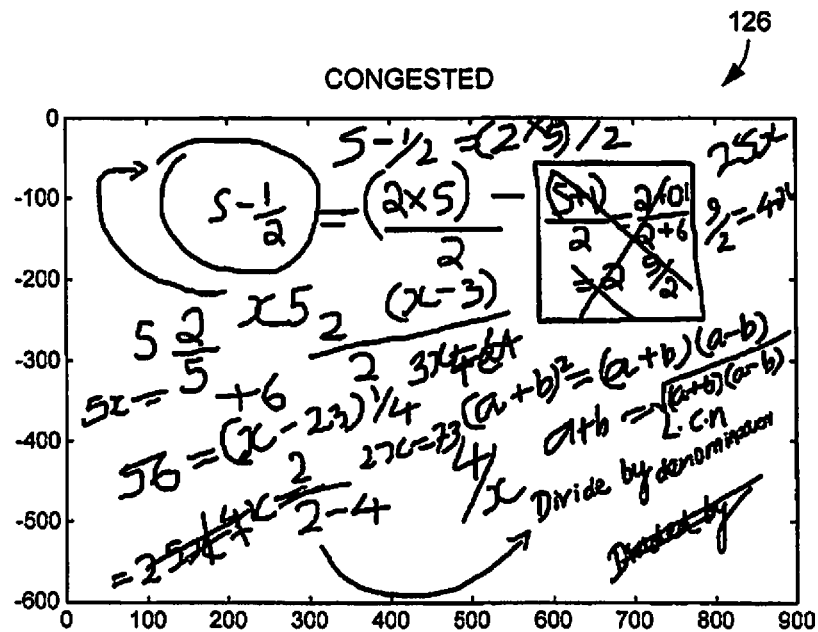
FIG. 9, is a screenshot example of written text determined as "congested" by the handwriting analysis, according to aspects of present technique.

The handwriting analysis assists in determining if the handwriting provided on the whiteboard is congested, good, or poor. Examples of good handwriting and congested handwriting are shown in FIG. 8 and FIG. 9 respectively.

The interactive system described above is configured to determine various audio, video, text and other general parameters for an interaction session. FIG. 10 is an example of a metrics table 128, listing various audio, video, text, handwriting parameters in addition to other general parameters. The calculated parameters for each metric are listed for all the topics/subjects covered, thus providing a consolidated report across all subjects/topics. For example, in one embodiment, parameters are calculated for multiple sessions namely A, B, C and D. Parameters calculated include shapes and images, color changes, number of whiteboards, and the like. The parameters calculated are then used to arrive upon the effectiveness score and the engagement score.

Figure 11:
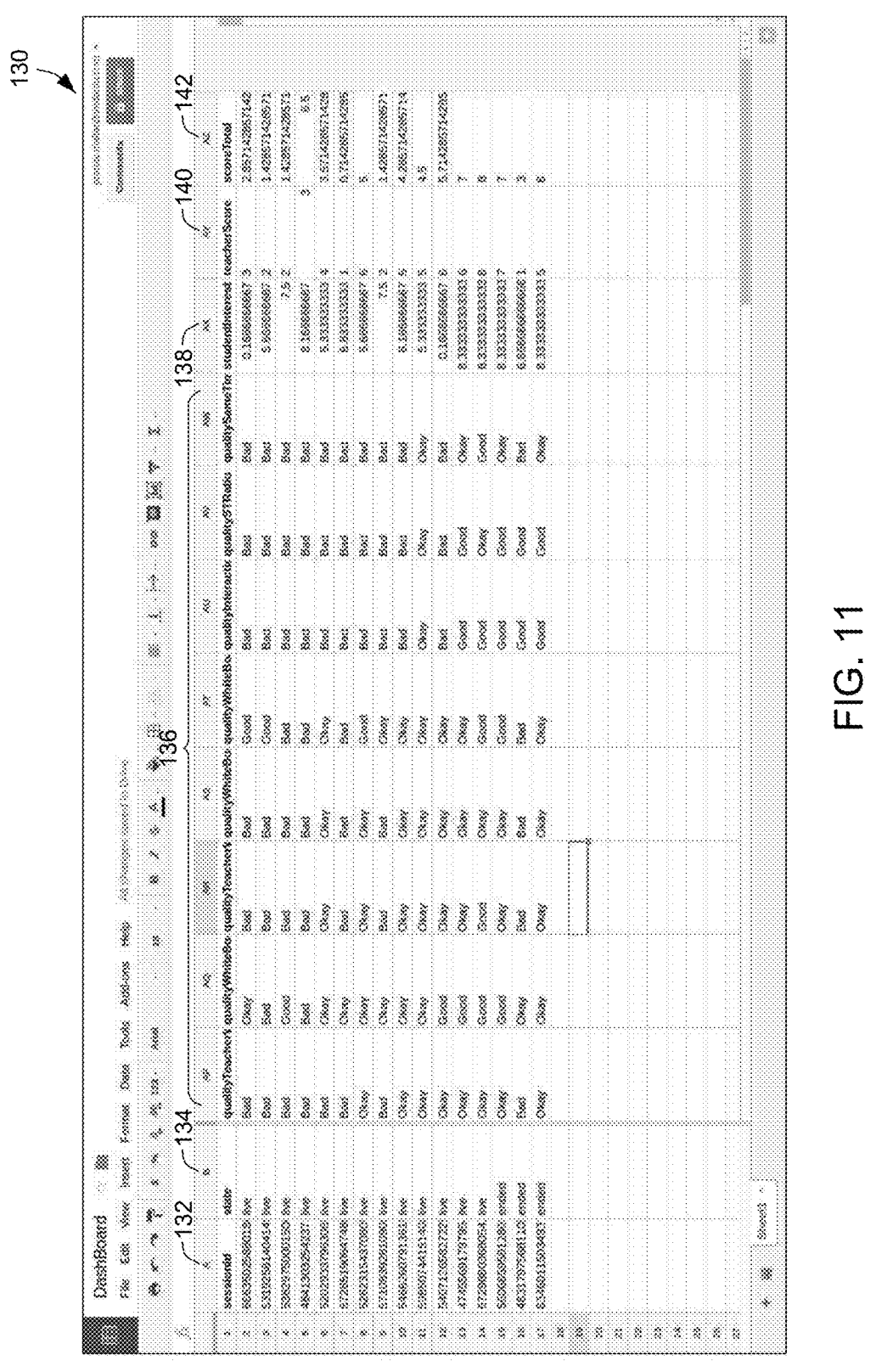

Further, it may be noted that the interactive system is configured to continuously monitor and calculate the effectiveness score and the engagement scores for multiple interaction sessions occurring between several users. It may be noted that the interaction sessions may occur simultaneously and across various geographic locations. The interactive system is configured to generate a comprehensive report of the scores at regular intervals of time. An example comprehensive list is shown in FIG. 11. Session identification numbers assigned to each interaction session are listed in column "sessionId" referenced by reference number 132. "State" 134 indicates a current state of the corresponding interaction session. Each state could either be "live" which indicates the session is in progress or "ended" which indicates the session has ended. As described in FIG. 3 through FIG. 7, various parameters are calculated for each session. The calculated parameters for each session is referenced by reference numeral 136. Based on such parameters, the engagement score 138 of the student and the effectiveness score 140 of the teacher for each interaction session is calculated and listed in their corresponding columns. The quality score is computed by mathematically correlating the engagement score and the effectiveness score and is indicated in column 142. In general, a high quality score indicates an effective interaction session.

Figure 12:
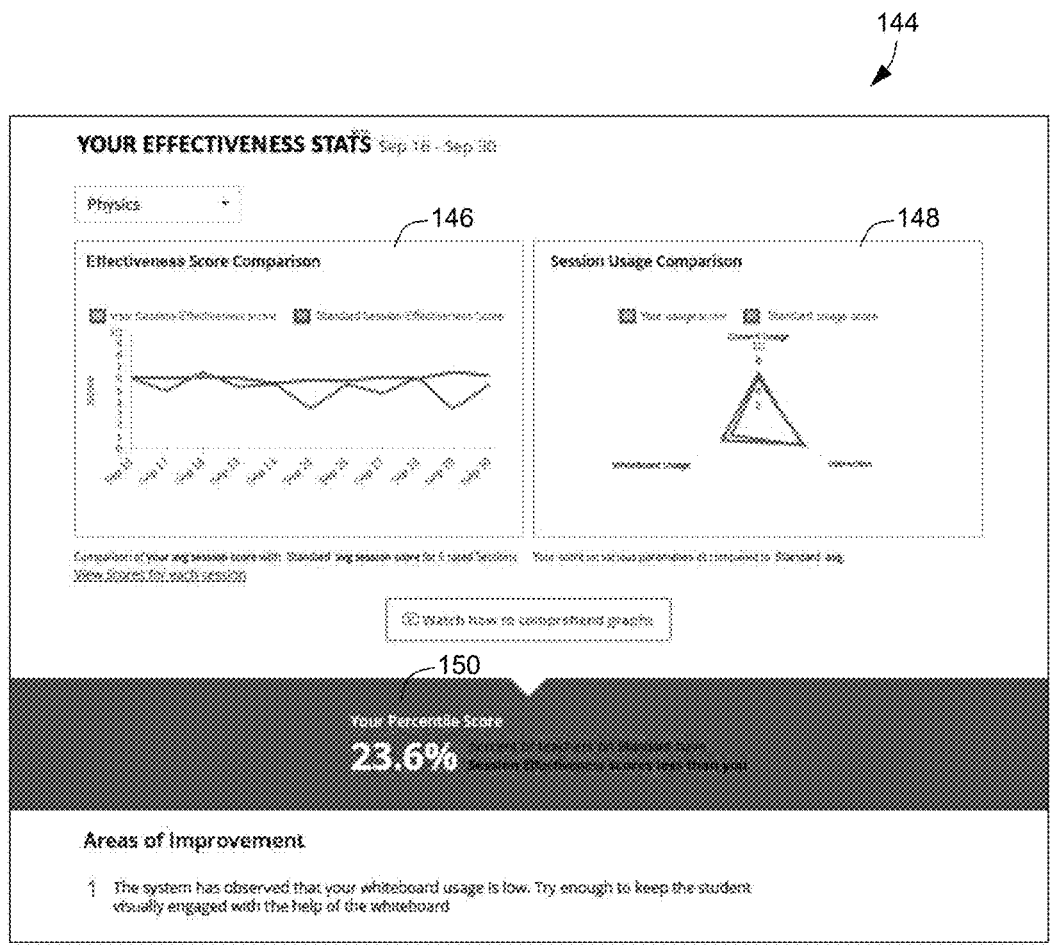
FIG. 12 is an example screenshot of a teacher's effectiveness report, implemented according to aspects of the present technique.

Furthermore, FIG. 12 shows the screenshot of a report 144 providing an effectiveness score of the teacher. Graph 146 is generated by comparing teacher's average effectiveness scores with standard average scores for multiple sessions. Similarly, graph 148 is generated by comparing the session usage of the teacher with standard average value. The session usage may include content usage, whiteboard usage and interaction data. Based on such data, a percentile score represented as "effectiveness score" is calculated. The calculated effectiveness score is displayed on panel 150 in the report and further areas of improvement are suggested at the end of the report. The report is notified to the teacher and the supervisor. The above described techniques provide several advantages including providing a very comprehensive calculation of the effectiveness of each interactive sessions by determining the engagement score and the effectiveness score. Since the scores are calculated by performing extensive data analysis, it is an accurate representation of a quality of each session. Further, by continuously providing feedback to the users engaged in the interaction session, all stakeholders get an immediate measure of the session they are involved in and also provide an opportunity to take corrective measures if the scores are not up to satisfaction. Also, the interactive system provides a unique technique by which users are classified so that each interaction session provides optimum benefit for the users.

The methods according to the above-described example embodiments of the inventive concept may be implemented with program instructions which may be executed by computer or processor and may be recorded in computer-readable media. The media may also include, alone or in combination with the program instructions, data files, data structures, and the like. The program instructions recorded in the media may be designed and configured especially for the example embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to execute one or more software modules to perform the operations of the above-described example embodiments of the inventive concept, or vice versa.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An interactive system for facilitating interaction between a plurality of users including at least one teacher and at least one student, the interactive system comprising:

a plurality of computing devices, wherein each of the plurality of computing devices is accessible to a corresponding user of the plurality of users, and each of the plurality of computing devices includes a user interface for the corresponding user, wherein the user interface is configured to enable the corresponding user to activate an interaction session amongst a selected set of the plurality of users, and the user interface comprises a whiteboard module including a writing area configured to enable the corresponding user to provide written content and view written content provided by other users amongst the selected set of the plurality of users participating in the interaction session, and a plurality of interactive tools coupled to the user interface and configured to enable the corresponding user to communicate with the selected set of the plurality of users via the user interface, wherein the plurality of interactive tools comprises a camera and a microphone configured to capture video data and audio data from the corresponding user during the interaction session;

a session data module coupled to the plurality of computing devices and configured to acquire session data including the written content, the video data, and the audio data from each of the plurality of computing devices during the interaction session, wherein the session data module comprises a text capturing module configured to acquire the written content provided via the whiteboard module from the plurality of computing devices engaged in the interaction session, a video data module configured to acquire the video data from the plurality of computing devices engaged in the interaction session, and an audio data module configured to acquire the audio data from the plurality of computing devices engaged in the interaction session;

a processing engine coupled to the session data module and configured to analyze the session data including the written content, the video data, and the audio data to determine session parameters including a plurality of writing parameters, a plurality of video parameters, and a plurality of audio parameters for each user, compute an effectiveness score and an engagement score based on the session parameters, wherein the effectiveness score indicates a level of effectiveness of a corresponding teacher and the engagement score indicates a level of engagement of a corresponding student during the interaction session, and the effectiveness score and the engagement score are continuously computed for the corresponding teacher and the corresponding student for a duration of the interaction session, and compute a quality score for the interaction session, wherein the quality score correlates to the effectiveness score of the corresponding teacher and the engagement score of the corresponding student; and a notification module coupled to the plurality of computing devices and configured to transmit the effectiveness score and the engagement score to corresponding computing devices at regular intervals within the duration of the interaction session and at an end of the interaction session, including transmitting the effectiveness score to a first computing device of the corresponding teacher, wherein the effectiveness score is displayed to the corresponding teacher via a first score panel of the user interface of the first computing device, and transmitting the engagement score to the first computing device of the corresponding teacher and to a second computing device of the corresponding student, wherein the engagement score is displayed to the corresponding teacher via the first score panel and to the corresponding student via a second score panel of the user interface of the second computing device.

2. The interactive system of claim 1, wherein the written content is viewable by each user amongst the selected set of the plurality of users participating in the interaction session via the whiteboard module.

3. The interactive system of claim 1, wherein the processing engine is further configured to generate a consolidated report indicating the session parameters, effectiveness scores, engagement scores, and quality scores of each interaction session for a given time interval, wherein the consolidated report indicates a level of effectiveness of each teacher and a level of engagement of each student during each interaction session.

4. The interactive system of claim 2, wherein the written content includes one or more of alpha-numeric text data, graphs, figures, images, and scientific notations.

5. The interactive system of claim 1, wherein the notification module is further configured to transmit the effectiveness score to a computing device of a supervisor of the corresponding teacher, and transmit the engagement score to a computing device of a guardian of the corresponding student.

6. The interactive system of claim 1, wherein the processing engine is further configured to compute a sentiment score by analyzing the video data, the audio data, and the written content.

7. The interactive system of claim 1, wherein the notification module is further configured to generate and transmit feedback forms or surveys to each user participating in each interaction session at the end of each interaction session; and the processing engine is further configured to analyze feedback or survey responses received from each user to identify any gaps occurring in each interaction session and classify each interaction session based on patterns observed in each interaction session based on one or more of the session parameters, the feedback or survey responses of each user, test results, manual reviews, or combinations thereof.

8. The interactive system of claim 2, wherein the whiteboard module further comprises a plurality of formatting tools configured to facilitate the corresponding user to generate the written content on the writing area, wherein the plurality of formatting tools include a digital pen for writing, a text tool for typing text, a color tool for changing colors of the writing or text, and a shape tool for generating figures and graphs, and an upload button configured to enable the corresponding user to upload images of one or more of questions, graphs, conceptual diagrams, theoretical references, and animated representations that are useful for the interaction session.

9. The interactive system of claim 1, wherein the processing engine is configured to analyze the written content to determine the plurality of writing parameters associated with each user by determining one or more of a writing length of the corresponding teacher and a writing length of the corresponding student based on an effective space used in the writing area of the whiteboard module, and determining a ratio of the writing length of the corresponding student to the writing length of the corresponding teacher, a writing time of the corresponding teacher and a writing time of the corresponding student based on an amount of time spent to provide the written content using the writing area of the whiteboard module, and determining a ratio of the writing time of the corresponding student to the writing time of the corresponding teacher, a number of pages used in the whiteboard module, wherein the number of pages indicates an amount of written content discussed between the corresponding teacher and the corresponding student during the interaction session, a number of times each user changes colors used in the writing area of the whiteboard module, wherein the number of times each user changes colors indicates a level of visibility and clarity of the written content, a number of instances that shapes, figures, graphs, or illustrations are used by each user in the writing area of the whiteboard module, a frequency of image uploads by each user using the whiteboard module, and a relevancy to the interaction session of the written content provided by each user using the writing area of the whiteboard module.

10. The interactive system of claim 9, wherein the processing engine is further configured to analyze the written content to determine the plurality of writing parameters by performing handwriting analysis including one or more of forming clusters of points on the writing area of the whiteboard module, and determining a density of the clusters of points using a K-means algorithm, wherein the density further indicates the level of visibility and clarity of the written content, classifying the clusters of points by analyzing the density to identify portions of points relating to alpha-numeric text data and to remove portions of points relating to non-text data including the shapes, figures, graphs, illustrations, or images, and determining a smoothness of handwriting by measuring a change in variance of consecutive angles formed by joining consecutive points, wherein the smoothness of the handwriting further indicates the level of visibility and clarity of the written content.

11. The interactive system of claim 1, wherein the processing engine is configured to analyze the video data to determine the plurality of video parameters by identifying facial expressions to determine attentiveness and interest level of the corresponding student during the interaction session, and tracking eye movement to determine whether the corresponding student is distracted during the interaction session, and analyze the audio data to determine the plurality of audio parameters by identifying one or more speakers by analyzing each voice present in the audio data and tagging each voice to a specific user participating in the interaction session, and one or more of measuring a total speaking time for each user, and determining a ratio of student speaking time to teacher speaking time, determining a number of pauses or periods of no activity for each user, determining a number of interrupts made by each user,
determining a conversation flow between the corresponding teacher and the corresponding student based on a number of times the corresponding student and the corresponding teacher converse on a specific topic or exchange questions, answers, or references,
identifying a number and types of questions based on the conversation flow,
determining a frequency of certain keywords used by each user, and determining a pattern based on instances of identified keywords of the corresponding teacher and a speaking rate of the corresponding teacher,
determining a number of instances each user described a topic along with an illustration,
performing tone analysis by comparing a tone of the voice of the corresponding teacher to a model, and
classifying each user based on certain criteria including
classifying the corresponding teacher as slow or fast paced, as using conceptual, illustrative or visual methods for explanations, and based on ability to engage students in problem solving, and
classifying the corresponding student as slow or fast learning, and based on a level of problem solving skills.

12. The interactive system of claim 1, further comprising at least one memory
wherein the processing engine is configured to extract the written content, the audio data, and the video data from the session data, and store the written content, the audio data, and the video data in the at least one memory.

13. The interactive system of claim 12, wherein the plurality of computing devices comprises one or more of mobile devices, tablets, and computers.

14. The interactive system of claim 12, wherein the written content, the audio data, and the video data is accessible by each user amongst the selected subset of the plurality of users participating in the interaction session.

15. The interactive system of claim 1, wherein the processing engine is configured to compute the effectiveness score and the engagement score based on the session parameters by assigning respective weights to the plurality of writing parameters, the plurality of video parameters, and the plurality of audio parameters according to a model.

* * * * *